United States Patent
Groenaas (Grønaas) et al.

(10) Patent No.: US 8,947,973 B2
(45) Date of Patent: Feb. 3, 2015

(54) ACTIVE DETECTION OF MARINE MAMMALS DURING SEISMIC SURVEYING

(75) Inventors: Halvor S. Groenaas (Grønaas), Oslo (NO); Svein Arne Frivik, Oslo (NO)

(73) Assignee: WesternGeco L.L.P., Houston, TX (US)

( * ) Notice: Subject to any disclaimer, the term of this patent is extended or adjusted under 35 U.S.C. 154(b) by 312 days.

(21) Appl. No.: 13/019,622

(22) Filed: Feb. 2, 2011

(65) Prior Publication Data

US 2012/0120760 A1    May 17, 2012

Related U.S. Application Data

(60) Provisional application No. 61/414,765, filed on Nov. 17, 2010.

(51) Int. Cl.
*G01V 1/38* (2006.01)
*G01V 1/00* (2006.01)
*G01S 15/04* (2006.01)

(52) U.S. Cl.
CPC ............. *G01V 1/001* (2013.01); *G01S 15/04* (2013.01); *G01V 1/38* (2013.01)
USPC .............................................. 367/20; 367/15

(58) Field of Classification Search
CPC ........... G01V 1/001; G01V 1/38; G01S 15/04
USPC ................ 367/15, 20, 139; 181/108, 110, 112
See application file for complete search history.

(56) References Cited

U.S. PATENT DOCUMENTS

| | | | |
|---|---|---|---|
| 4,509,151 A | 4/1985 | Anderson | |
| 4,974,213 A | 11/1990 | Siwecki | |
| 5,351,218 A | 9/1994 | Hatteland et al. | |
| 6,684,160 B1 | 1/2004 | Ozbek et al. | |
| 7,085,195 B2 * | 8/2006 | Taner et al. | 367/50 |
| 7,400,552 B2 | 7/2008 | Moldoveanu et al. | |
| 7,426,439 B2 | 9/2008 | Ozdemir et al. | |
| 7,466,625 B2 | 12/2008 | Robertsson et al. | |
| 8,467,264 B2 | 6/2013 | Keers et al. | |
| 2006/0246654 A1 | 11/2006 | Shin | |
| 2007/0025182 A1 | 2/2007 | Robertsson | |
| 2008/0008037 A1 | 1/2008 | Welker | |
| 2008/0144442 A1 | 6/2008 | Combee et al. | |
| 2008/0186804 A1 | 8/2008 | Amundsen et al. | |
| 2008/0267010 A1 | 10/2008 | Moldoveau et al. | |
| 2008/0270035 A1 * | 10/2008 | Ozdemir et al. | 702/17 |
| 2009/0003132 A1 | 1/2009 | Vassallo et al. | |
| 2009/0141587 A1 | 6/2009 | Welker et al. | |
| 2009/0251991 A1 | 10/2009 | Ayela et al. | |
| 2010/0067326 A1 | 3/2010 | Iranpour et al. | |
| 2010/0278010 A1 * | 11/2010 | Gubin et al. | 367/16 |

(Continued)

OTHER PUBLICATIONS

Nieukirk et al., "Low-frequency whale and seismic airgun sounds recorded in the mid-Atlantic Ocean", J. Acoust. Soc. Am. 115(4), Apr. 2004, pp. 1832-1843.*

(Continued)

*Primary Examiner* — Ian J Lobo

(57) ABSTRACT

An embodiment according to one or more aspects of the present disclosure for conducting a marine survey includes towing a survey spread comprising a plurality of receivers and an energy source along a selected course; emitting a signal from an energy source; receiving backscattered acoustic signals at the receivers; and actively detecting a cetacean from the received data.

24 Claims, 2 Drawing Sheets

(56) References Cited

U.S. PATENT DOCUMENTS

2010/0302901 A1* 12/2010 Welker et al. .................... 367/21
2011/0058449 A1* 3/2011 Stenzel ........................... 367/20

OTHER PUBLICATIONS

Potter et al., "Visual and Passive Acoustic Marine Mammal Observations and High Frequency Seismic SOurce Characteristics Recorded during a Seismic Survey", IEEE Journal of Oceanic Engineering, vol. 32, No. 2, pp. 469-483.*

Hedgeland et al., "Marine Mammal Mitigation and Seismic Operations", Extended Abstracts, PESBG, PETEX 04 Conference and Technical Exhibition, five pages.*

International Search Report and Written Opinion issued in PCT/US2011/060322 on Jun. 1, 2012, 9 pages.

Brill, et al., "Assessment of dolphin (*Tursiops truncatus*) auditory sensitivity and hearing loss using jawphones", The Journal of the Acoustical Society of America, vol. 109, No. 4, Apr. 2001, pp. 1717-1722.

Parvin, et al., "The Target Strength of marine mammals, and estimated performance of Active Acoustic Monitoring systems", Subacoustech Report No. 565R0608, Feb. 2, 2007, 15 pages.

Zoidis, et al., "Vocalizations produced by humpback whale (*Megaptera novaeangliae*) calves recorded in Hawaii", The Journal of the Acoustical Society of America, vol. 123, No. 3, Mar. 2008, pp. 1737-1746.

* cited by examiner

ACTIVE DETECTION OF MARINE MAMMALS DURING SEISMIC SURVEYING

CROSS-REFERENCE TO RELATED APPLICATIONS

This application claims the benefit of U.S. Provisional Patent Application No. 61/414,765, filed Nov. 17, 2010.

TECHNICAL FIELD

The present disclosure relates in general to detecting and determining the position of marine mammals and more specifically to protecting marine mammals from man-made energy sources (e.g., acoustic disturbances).

BACKGROUND

In an ever increasing frequency man and marine mammals are crossing paths. It is therefore a desire to mitigate any harmful exposure of the marine mammals to man's activities. One source of concern for marine mammals is marine survey operations. Heretofore, various systems have been proposed and utilized to identify and position marine mammals. However, these systems are often undesirable in construction, logistical requirements in addition to providing only the most rudimentary functionality.

There is a continuing desire to provide and display real-time information to mitigate the harm or perceived harm to marine mammals from marine survey operations. There is a desire to identify safety or prevention zones for the marine mammals. There is also a desire to provide efficient survey operations while limiting contact with marine mammals. Furthermore, there is a desire to utilize an active monitoring system as opposed to currently available passive systems, which react only upon marine mammal vocalization. And there is a desire to integrate active monitoring systems into current seismic surveying operations to achieve efficiency gains.

SUMMARY

The systems and methods of the present disclosure are directed to active monitoring of marine mammals, including cetaceans, during or in conjunction with marine seismic surveying. The systems and methods are "active" in the sense that cetacean detection is possible without having to wait for a marine mammal vocalization.

An embodiment according to one or more aspects of the present disclosure of a monitoring system for marine mammal detection integrated into a marine survey system includes an array of receivers; an energy source emitting a signal for conducting marine surveys and to generate a backscatter of acoustic energy when the signal encounters a marine mammal; and a processing unit adapted to receive data from the array of receivers corresponding to the backscattered acoustic energy to detect the presence of a marine mammal.

An embodiment according to one or more aspects of the present disclosure of a method for limiting contact with marine mammals during marine survey operations comprises conducting a seismic survey; identifying a prevention zone relative to the seismic survey; detecting the presence of a marine mammal by receiving and analyzing backscattered acoustic energy; and limiting contact with the prevention zone.

An embodiment according to one or more aspects of the present disclosure for conducting a marine survey includes towing a survey spread comprising a plurality of receivers and an energy source along a selected course; emitting a signal from an energy source; generating backscattered acoustic energy from the signal; receiving the backscattered acoustic energy at the plurality of receivers; using the data received at the plurality of receivers to detect a marine mammal from the received data; positioning the detected marine mammal; limiting contact with the detected marine mammal; and conducting a marine survey.

The foregoing has outlined some of the features and technical advantages of the present disclosure in order that the detailed description that follows may be better understood. Additional features and advantages of the present disclosure will be described hereinafter which form the subject of the claims.

BRIEF DESCRIPTION OF THE DRAWINGS

The foregoing and other features and aspects of the present invention will be best understood with reference to the following detailed description of a specific embodiment of the invention, when read in conjunction with the accompanying drawings, wherein.

DETAILED DESCRIPTION

Figure 1:
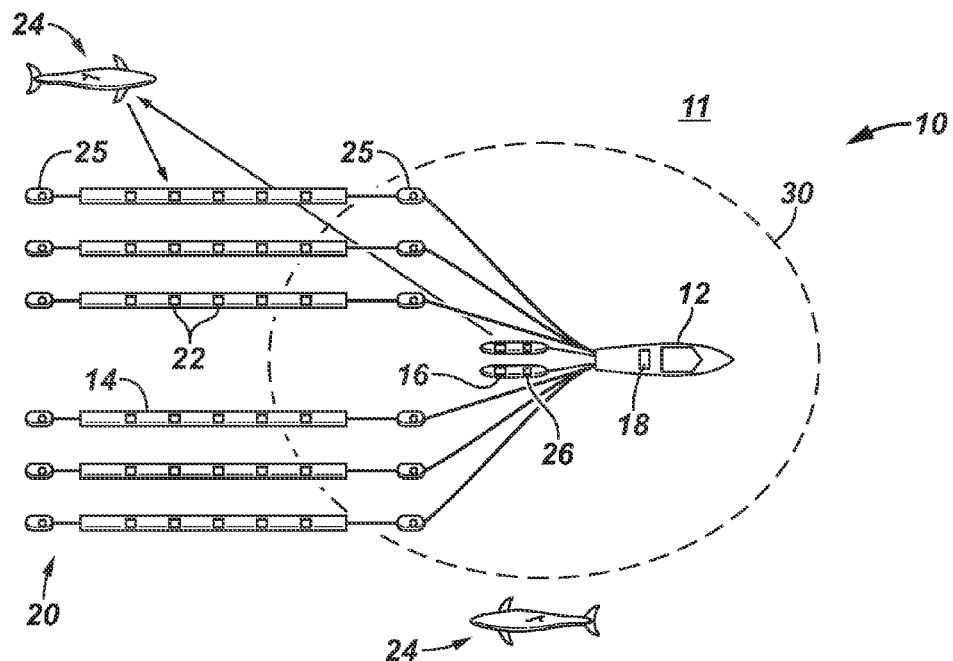
FIG. 1 is a plan view of an embodiment of a cetacean protection system of the present integrated in a marine survey system.

Refer now to the drawings wherein depicted elements are not necessarily shown to scale and wherein like or similar elements are designated by the same reference numeral through the several views.

Figure 2:
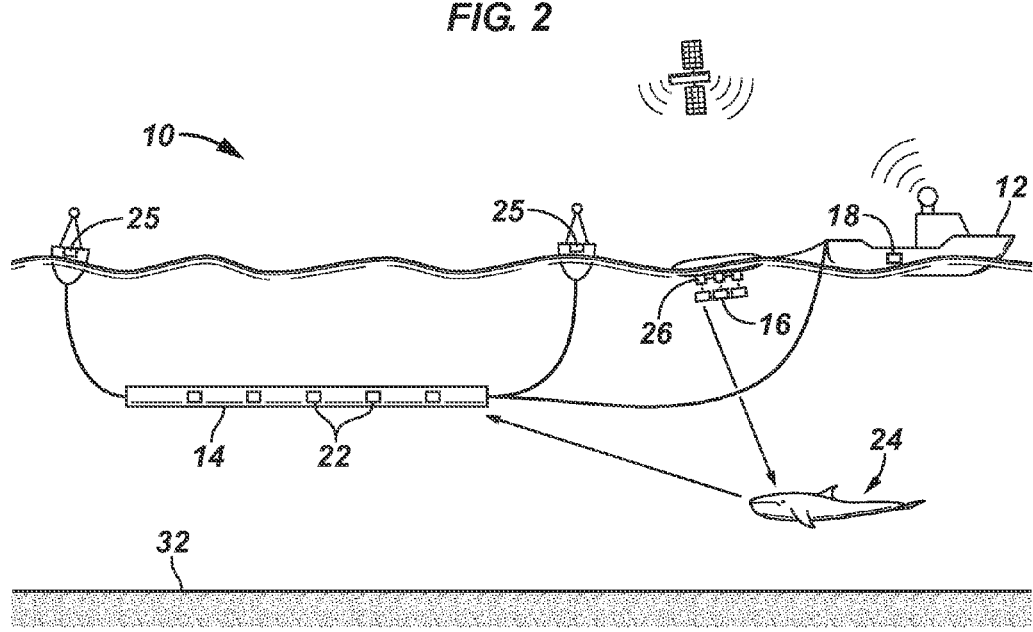
FIG. 2 is an elevation view of an embodiment of the cetacean protection system of the present invention.

Schematic, plan and elevation views of an embodiment of a marine seismic survey system 10, which may be used to actively detect marine mammals in a seismic survey region 11, are illustrated in FIGS. 1 and 2. Marine mammals are defined generally herein as cetaceans and include without limitation whales, porpoises, dolphins, sea otters, sea lions, seals, and walruses. Some examples of marine survey systems that may be utilized in whole or in-part for marine mammal detection are disclosed in: U.S. patent application Ser. No. 12/132,592; U.S. Pat. Nos. 7,466,625; 7,426,439; 7,400,552; 6,684,160 and 5,351,218; and U.S. Patent Application Publication Nos. 2009/0141587; 2009/0003132; 2008/0267010; 2008/0186804; 2008/0144442; 2008/0008037; 2007/0025182 and 2006/0246654; all of which are incorporated herein by reference.

The marine seismic survey system 10 includes a vessel 12, one or more towed streamers 14, a survey source 16, and a processing unit 18. The seismic streamers 14 may be several thousand meters long and contain a large number of sensors, which are distributed along the length of the each seismic streamer cable. Reference may be made to the in-line direction as the direction in the horizontal plane parallel to the streamer(s). A Cartesian coordinate system will also be used where the in-line direction is referred to as the x-direction. Conversely, the cross-line direction may be referred to as the direction in the horizontal plane perpendicular to the streamer(s). In the Cartesian coordinate system, the cross-line direction is referred to as the y-direction.

Vessel 12 commonly tows a plurality of streamers 14 laterally spaced from one another to form a spread 20 for conducting the marine survey. The spread 20 generally includes the sources 16, which may be towed from the same vessel as the streamers or may be towed by a separate vessel. Each streamer 14 commonly includes a plurality of receivers 22, which may include without limitation vector wavefield sensors. Examples of receivers 22 include without limitation, accelerometers, hydrophones, geophones, electromagnetic receivers, optical sensors, particle motion sensors, pressure gradient sensors and combinations thereof. Receivers 22 may be single sensor receivers. In some embodiments, one or more of receivers 22 may be grouped formed. Examples of some group formed, and multi-component streamers, are disclosed in U.S. Pat. Nos. 6,684,160 and 5,351,218 and in U.S. Patent Application Publication No. 2009/0003132, which are incorporated herein by reference.

During seismic surveying, the sources 16 generate seismic waves, which propagate into the geological formations creating pressure changes and vibrations along their way. Changes in elastic properties of the geological formation scatter the seismic waves, changing their direction of propagation and other properties. Part of the energy emitted by the sources 16 reaches seismic sensors 22 disposed in the streamers 16. Some seismic sensors 22 are sensitive to pressure changes (hydrophones), others to particle motion (e.g., geophones), and industrial surveys may deploy only one type of sensors or both. In response to the detected seismic events, the sensors 22 generate electrical signals to produce seismic data. Analysis of the seismic data can then indicate the presence or absence of probable locations of hydrocarbon deposits. Similarly, electromagnetic (EM) surveying can use EM sources and receivers. One type of EM surveying is referred to as controlled source EM surveying (CSEM), in which an EM transmitter is used to generate EM signals that are propagated into the subterranean structure. Subterranean elements reflect the EM signals, with the reflected EM signals received by the EM receivers.

For the case of multi-component seismic sensors, each sensor may be capable of detecting a pressure wavefield and at least one component of a particle motion that is associated with acoustic signals that are proximate to the multi-component seismic sensor. Examples of particle motions include one or more components of a particle displacement, one or more components (inline (x), crossline (y) and vertical (z) components) of a particle velocity and one or more components of a particle acceleration.

Depending on the particular embodiment, the multi-component seismic sensor may include one or more hydrophones, geophones, particle displacement sensors, particle velocity sensors, accelerometers, pressure gradient sensors, or combinations thereof. For example, in accordance with some embodiments, a particular multi-component seismic sensor may include a hydrophone for measuring pressure and three orthogonally-aligned accelerometers to measure three corresponding orthogonal components of particle velocity and/or acceleration near the seismic sensor. It is noted that the multi-component seismic sensor may be implemented as a single device or may be implemented as a plurality of devices, depending on the particular embodiment. A particular multi-component seismic sensor may also include pressure gradient sensors, which constitute another type of particle motion sensors. Each pressure gradient sensor measures the change in the pressure wavefield at a particular point with respect to a particular direction. For example, one of the pressure gradient sensors may acquire seismic data indicative of, at a particular point, the partial derivative of the pressure wavefield with respect to the crossline direction, and another one of the pressure gradient sensors may acquire, a particular point, seismic data indicative of the pressure data with respect to the inline direction.

The system 10 may be used to actively detect the presence of marine mammals in the survey region 11. In particular, the emitted acoustic signals from the sources 16 may be used to proactively detect the presence of marine mammals in the survey region without having to wait for a vocalization. In practice, the source 16 emits an acoustic signal A that propagates outwardly until the wave front encounters an object, such as whale 24. Depending on the impedance contrast between the whale 24 and the surrounding water, some of the acoustic energy may be backscattered and thus travel back towards the seismic spread 20 and detected by the sensors 22 in the streamers 14. In some embodiments, additional sensors 22 may be deployed either on the spread itself (e.g. on the sources 16) or in other areas of the survey region, such as on the seabed. Such additional sensors may also be used to detect the backscattered energy. The sensors 22 detect the backscattered energy in the form of signals, which may then be processed, such as in processing unit 18, to detect and subsequently localize (i.e., position or locate) the whale 24.

Upon detection, the whale 24 may be positioned using the time origin of the acoustic signal emission and the time at which the backscattered signal was received at the sensors 22 to determine the two-way travel time. The two-way travel time may then be combined with an assumed propagation path to determine the position of the whale 24.

In some embodiments, in addition to sensing seismic data, the sensors 22 may also be utilized for acoustic positioning. In such embodiments, the sensors 22 may be sampled at a higher frequency for acoustic positioning relative to a lower frequency for seismic data. Backscattered energy identifying a cetacean may be detected in both the high frequency domain and the low frequency domain or in either domain. In other embodiments, additional sensors dedicated to acoustic positioning may be provided in addition to the seismic sensors. Such additional sensors may also be used to detect backscattered energy representative of a cetacean.

Figure 3:
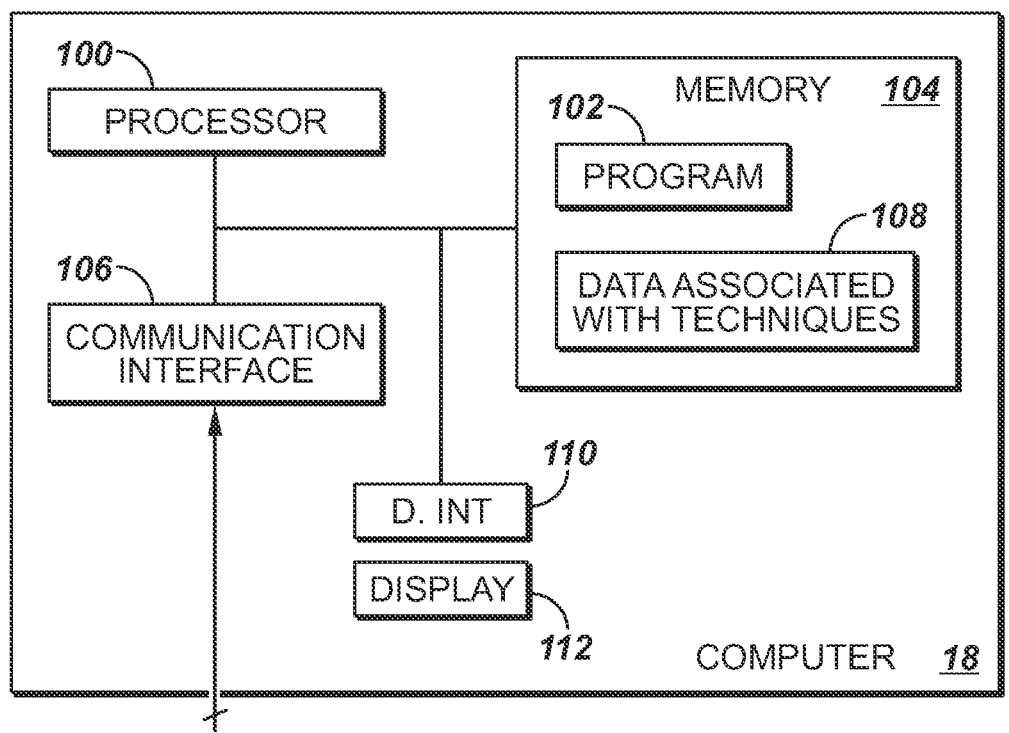
FIG. 3 is a schematic diagram of a data processing system for carrying out processing techniques according to the present disclosure.

Referring to FIG. 3, in accordance with some embodiments of the present disclosure, the processing unit 18 may include a processor 100 that is constructed to execute at least one program 102 (stored in a memory 104) for purposes of processing data to perform one or more of the techniques that are disclosed herein (e.g., processing the received backscattered acoustic signals to detect the presence of marine mammals). The processor 100 may be coupled to a communication interface 106 for purposes of receiving data. In addition to storing instructions for the program 102, the memory 104 may store preliminary, intermediate and final datasets involved in the techniques (data associated with techniques 108) that are disclosed herein. The presence-detecting signals, for example, may be stored here. Among its other features, the processing unit 18 may include a display interface 110 and display 112 for purposes of displaying the various data that is generated as described herein. For example, the display 112 may indicate the location of the whale relative to the survey system 10.

Referring again to FIGS. 1-2, in some embodiments, system 10 may position the detected cetacean for example, and without limitation, by performing beam-forming processing. System 10 may utilize vector sensors for detecting and/or positioning the cetaceans. Of course, other positioning techniques may be used according to the present disclosure, including matched field processing, correlation, travel time inversion and migration. Positioning may include determining the position relative to a prevention zone (described later) or the like, determining a range to cetacean 24 and/or a range and direction to cetacean from a selected location.

The methods of the present disclosure may be carried out with a variety of seismic sources 16, including air guns, marine vibrators, sparkers, water guns and even electromagnetic sources. In embodiments where marine vibrators (or other sources whose signature can be modulated) are used, such sources 16 can be implemented such that one source uses a signature that is orthogonal to the other sources and may also be optimized for an active SONAR signature. Also, the spectral content of the source may be changed to minimize impact on the detected marine mammal.

Each streamer 14 may also include a global positioning (GPS) unit 25. GPS unit 25 may be carried by a buoy and may be combined with various elements and systems such as and without limitation a guidance system and transceiver. Although not illustrated specifically in FIG. 1 or 2, it is understood that survey spread 22 may include a ranging and positioning system that may include pingers and dedicated ranging receivers.

In the depicted embodiment, source 16 includes one or more source receivers 26 which may include, without limitation, vector wavefield sensors, hydrophones, geophones, accelerometers, positioning hydrophones, near field hydrophones (NFH), particle motion sensors, pressure gradient sensors, electromagnetic sensors and combinations thereof. Source 16 and source receivers 26 may be positioned on a streamer that is separate from the survey streamer. In some embodiments, one or more receivers 22, 26 may, for example, be positioned on a streamer that is towed behind the source streamer and ahead of the survey streamer. It is also recognized that the survey streamer and the source streamer may be towed behind separate vessels.

According to one or more aspects of the present disclosure, system 10 may detect and position cetaceans 24 such that remedial actions may be taken to limit and/or preclude exposure of the cetacean to a prevention zone, generally denoted by the numeral 30. According to one or more aspects of the present disclosure, system 10 may determine (e.g., define) prevention zone 30, provide remedial actions to maintain a defined prevention zone, and/or implement actions to maintain the prevention zone. For example, prevention zone 30 may be defined as an area relative to a portion of the survey, such as source 16 for example. Prevention zone 30 may include one or more areas, or subzones. Prevention zone 30 may be defined in terms of areas in which it is desired to exclude the cetacean and/or to an area in which exposure of the cetacean is to be limited (e.g., time of exposure). Prevention zone(s) 30 may be defined statically (e.g., a set geographic boundary) and/or dynamically (e.g., associated with operational factors, parameters, characteristics). System 10 may provide remedial steps or options for maintaining the prevention zone, for example to exclude the presence of the cetacean, limit the time of exposure, etc.). System 10 may implement actions to maintain the prevention zone. For example, according to one or more aspects of the present disclosure remedial actions may include, without limitation, altering the course of the seismic survey, ceasing seismic operations, changing operational parameters such as the frequency and/or amplitude of the "shots" (e.g., sources 16) and/or projecting sound from a vessel or other flotation element associated with the seismic survey. Methods may also be carried out for calculating sound exposure levels using, for example, calibrated marine source algorithms with propagation models to check if the acoustic levels are dangerous for the detected cetacean.

Prevention zone 30 may be defined in various manners including, without limitation, by real and/or perceived effects of operations on cetaceans (e.g., acoustic effects, pressure effects, physical impacts), by regulation (e.g., government regulation), risk of physical damage to the cetacean and/or equipment, and/or environmental factors. For example, the United States Mineral Management Service requires what is termed as an exclusion zone of 500 meters for a water depth of 300 meters. This regulated exclusion zone is statically defined and does not take into consideration the actual operational parameters or characteristics, such as the frequency and amplitude of source 168 shots. According to one or more aspects of the present disclosure, prevention zone(s) may be defined relative to operational characteristics of the seismic survey and the criteria for precluding or limiting exposure of the cetacean. For example, according to one or more aspects of the present disclosure the acoustic level (e.g., energy level) associated with source 16 shots in a particular survey may be utilized to define the prevention zone(s). Prevention zones 30 that are associated with operational parameters may be referred to as dynamic prevention zones. In other words, by altering one or more operational parameters of the survey the scope or boundaries of the prevention zone may be dynamically altered (e.g., in real time) so that the concerns for the cetacean are addressed as well as permitting the survey to continue.

In some embodiments, positioning of cetacean 24 may not be limited to locating a specific geographic position of the cetacean but be related to determining a range to the cetacean, for example, the distance between source 16 and the cetacean, or the location of cetacean relative to a prevention zone. Processing unit 20 may provide a visual display 112 (FIG. 3) and/or an auditable signal if the tracked cetacean 24 is positioned in and/or is approaching a prevention zone 30. Processing unit 20 may provide an option to minimize the disruption to the survey operations. For example, processing unit 20 may provide alternative courses for "shooting" the line or for shooting subsequent lines; alternative amplitude and/or frequencies emitted by source 16 to avoid affecting cetacean 28; and/or ceasing operations until the detected cetacean has cleared the prevention zone.

In one embodiment, source receivers 26 provide for utilization of very high sampling rates as well as continuous data recording. Therefore, a good resolution can be obtained in the desired frequency domain. For example, survey source 16 may be 15 meters long and include 2 to 4 sub arrays separated by 5 to 10 meters. Each one of the sub arrays may include several source receivers 26. Thus, a 3-dimensional array of data to determine the range and heading, as well as the depth, of cetacean 24 may be obtained.

As noted, system 10 may include multi-component and/or group formed streamers 14. In some embodiments, cetacean 24 may be detected and positioned directly from the input data without requiring sophisticated signal processing techniques, such as beam forming, for example utilizing vector sensor technology.

System 10 may predict the survey energy (e.g., sound, acoustic) level of positions around the survey operation. For example, the estimated far field signature of survey source 16 may be based on the measured response of source receivers 26. A calibrated marine source may be utilized to produce the estimated far field signature based on the measured source receivers 26 response. The calibrated marine source can calculate the source signature in all directions. A propagation model may be used to determine the sound field at any point around the selected location (e.g., source 16). Sound propagation can be determined using different methods that solve the wave equation with given boundary conditions. These methods include, without limitation, ray tracing, wave number integration techniques, normal modes, finite element methods, and other broadband modeling schemes.

Alternatively or in addition to the calculated far field signature, stored historical acquired high frequency survey source data may be utilized to predict acoustic fields (e.g., sound fields) across the survey operation. Prevention zone 30 may also be identified as a specific acoustic field in some embodiments. The output from this step may be a display of contour lines of sound/acoustic pressure levels at different distances from survey source 16.

As will be further understood below, the acoustic fields may provide a more accurate determination for a prevention zone 30 than a general geometric determination. The acoustic fields provide a means of providing a real-time, or dynamic, prevention zone that may be associated with the acoustic level (e.g., amplitude). For example, when conditions such as water depth and/or the survey source output signal are changed the acoustic level encountered at various distances from the source can change. Thus, the protection provided by a mandated prevention zone of 500 meter, for example, may be equally provided by a 250 meter prevention zone by changing the survey operation criteria. Thus, disruptions to the survey operations and exposure of the cetacean to the survey source may be mitigated. System 10 provides a way to make decisions to maintain a geographic distance from the detected cetacean as well as the functionality to adjust operational characteristics to avoid the undesired effects on the cetacean. For example, and without limitation, system 10 may provide for determining and choosing an alternative line for shooting to avoid the cetacean and/or changing shooting characteristics such as reducing and or changing the amplitude and/or frequency emitted from source 16. In other words, by changing the survey parameters, such as the amplitude and/or frequency of the seismic source the extent of the prevention zone may be altered, for example, reduced. One method for reducing the amplitude comprises turning off one or more of the energy sources 16 during shooting. Limiting and/or avoiding contact of cetacean 24 and the prevention zone 30 may comprise limiting the time of exposure such that the hearing loss, or equivalent, is limited or avoided.

System 10 may further include the determination and/or estimated exposure of the identified and tracked cetacean 24 to survey source 16. For example, based on acoustic fields and the course of cetacean 24 and the time in which the cetacean was in each zone the exposure level of cetacean 24 may be determined. This data may be utilized for long term studies of effects on cetaceans as well as for dynamic control of the survey operations.

The method may include conducting marine survey operations. For example, the method may comprise emitting a signal from an energy source; capturing reflections of the signal at the plurality of receivers; and utilizing the captured reflections for marine survey operations. The recorded data may be continuously recorded or may be periodically recorded, for example, in association with emitting the signal from the energy source.

In some embodiments, active detection of marine mammals may be combined with passive tracking. For example, a significant amount of backscattered acoustic signals may indicate the presence of a marine mammal. To further monitor such mammal, however, passive methods, which detect marine mammal vocalizations, may then be employed. One such method of passive monitoring is disclosed in co-pending patent application Ser. No. 12/546,991, which is incorporated herein by reference. In this manner, the initial detection may be confirmed using passive monitoring. Of course, the sequence of monitoring may be reversed and thus passive detection (detection upon vocalization) may be used to first detect the presence of a marine mammal and then active detection methods according to the present disclosure may be used to then actively track the location of the marine mammal.

Although specific embodiments of the invention have been disclosed herein in some detail, this has been done solely for the purposes of describing various features and aspects of the invention, and is not intended to be limiting with respect to the scope of the invention. For example, although the processing unit 18 is depicted in the figures to be disposed on the survey vessel 12, it is to be appreciated that in some embodiments, the processing unit may be disposed within the streamer 14 or alternatively on another vessel or onshore. It is therefore contemplated that various substitutions, alterations, and/or modifications, including but not limited to those implementation variations which may have been suggested herein, may be made to the disclosed embodiments without departing from the spirit and scope of the invention as defined by the appended claims which follow.

What is claimed is:

1. A method for actively detecting marine mammals during a seismic survey, comprising:
   towing a seismic spread having one or more sources and one or more receivers;
   emitting acoustic signals from the one or more sources, such acoustic signals generating backscattered energy when the acoustic signals intercept a marine mammal and a geological formation;
   receiving at least some of the backscattered energy at the one or more receivers;
   generating data from the at least some of the backscattered energy; and
   processing the data to initially detect the marine mammal based on time origin of the acoustic signals and the time at which at least some of the backscattered energy is received at the one or more receivers.

2. A method according to claim 1, further comprising positioning the marine mammal.

3. A method according to claim 2, wherein positioning the marine mammal comprises one or more of beam-forming processing, matched field processing, correlation, travel time inversion and migration.

4. A method according to claim 1, further comprising simultaneously conducting a seismic survey with the one or more sources and one or more receivers.

5. A method according to claim 4, wherein simultaneously conducting a marine survey comprises using the same receivers to receive backscattered energy that are used to receive acoustic signals reflected off of geological formations beneath the sea surface.

6. A method according to claim 4, wherein simultaneously conducting a marine survey comprises using the same receivers to receive backscattered energy that are used for acoustic positioning.

7. A method according to claim 3, further comprising identifying a prevention zone and determining the position of the marine mammal relative to the prevention zone.

8. A method according to claim 7, further comprising changing at least one survey operation criteria when the marine mammal is determined to be in the prevention zone.

9. A method according to claim 8, wherein changing at least one survey operation criteria comprises one or more of determining and choosing an alternative line for shooting and changing source shooting characteristics.

10. A method according to claim 9, wherein changing source shooting characteristics comprises reducing the amplitude or frequency emitted from the source.

11. A method according to claim 9, wherein reducing the amplitude comprises turning off one or more sources during the survey.

12. A method according to claim 1, further comprising passively monitoring the marine mammal after detection.

13. A method according to claim 12, wherein passively monitoring the marine mammal after detection comprises detecting one or more vocalizations from the marine mammal.

14. A method for actively detecting and passively monitoring marine mammals during a seismic survey, comprising:
- towing a seismic spread having one or more sources and one or more receivers;
- emitting acoustic signals from the one or more sources, such acoustic signals generating backscattered energy when the acoustic signals intercept a marine mammal and a geological formation;
- receiving at least some of the backscattered energy at the one or more receivers;
- generating data from the backscattered energy;
- processing the data to initially detect the marine mammal based on time origin of the acoustic signals and the time at which at least some of the backscattered energy is received at the one or more receivers; and
- monitoring the marine mammal after detection by detecting one or more vocalizations of the marine mammal.

15. A method according to claim 14, further comprising positioning the marine mammal according to one or more techniques comprising beam-forming processing, matched field processing, correlation, travel time inversion and migration.

16. A method according to claim 14, further comprising simultaneously conducting a seismic survey with the one or more sources and one or more receivers.

17. A method according to claim 16, wherein simultaneously conducting a marine survey comprises using the same receivers to receive backscattered energy that are used to receive acoustic signals reflected off of geological formations beneath the sea surface.

18. A method according to claim 15, further comprising identifying a prevention zone and determining the position of the marine mammal relative to the prevention zone.

19. A system for active marine mammal detection integrated into a marine survey system, comprising:
- an energy source for emitting acoustic signals;
- an array of receivers adapted to receive backscattered energy generated when the acoustic signals intercept a marine mammal and a geological formation, and adapted to generate data from the backscattered energy; and
- a processing unit adapted to receive and process the data associated with the backscattered acoustic signals to initially detect a marine mammal based on time origin of the acoustic signals and the time at which at least some of the backscattered energy is received at the one or more receivers.

20. A system according to claim 19, wherein the processing unit is disposed on a vessel associated with the survey system.

21. A system according to claim 19, wherein the processing unit is disposed in a streamer associated with the survey system.

22. A method according to claim 1, comprising such acoustic signals reflecting off of geological formations beneath the sea surface thereby creating reflections that are received by the receivers, generating data from the acoustic signals that reflected off the geological formations, and processing the data to indicate the presence or absence of probable locations of hydrocarbon deposits.

23. A method according to claim 14, comprising such acoustic signals reflecting off of geological formations beneath the sea surface thereby creating reflections that are received by the receivers, generating data from the acoustic signals that reflected off the geological formations, and processing the data to indicate the presence or absence of probable locations of hydrocarbon deposits.

24. The system according to claim 19, wherein the array of receivers is adapted to receive energy generated when the acoustic signals reflect off of geological formations beneath the sea surface, and are adapted to generate data from the received energy; and
- the processing unit is adapted to receive and process the data to indicate the presence or absence of probable locations of hydrocarbon deposits.

* * * * *